United States Patent [19]
Tamura et al.

[11] Patent Number: 5,509,472
[45] Date of Patent: Apr. 23, 1996

[54] HEAT-RESISTING PLATE HAVING A COOLING STRUCTURE AND METHOD OF MANUFACTURING IT

[75] Inventors: Masataka Tamura; Yutaka Ishiwata; Yoshiyasu Itoh, all of Kanagawa, Japan

[73] Assignee: Kabushiki Kaisha Toshiba, Kawasaki, Japan

[21] Appl. No.: 977,166

[22] Filed: Nov. 16, 1992

[30] Foreign Application Priority Data

Nov. 14, 1991  [JP]  Japan ................................. 3-298831

[51] Int. Cl.⁶ ........................................... F28F 3/12
[52] U.S. Cl. ............................... 165/171; 165/168
[58] Field of Search .................................. 165/168, 171

[56] References Cited

U.S. PATENT DOCUMENTS

| | | | |
|---|---|---|---|
| 2,124,110 | 7/1938 | Hall | 165/171 X |
| 3,120,869 | 2/1964 | Carpenter | 165/171 |
| 5,251,689 | 10/1993 | Hakim-Elahi | 165/46 |

FOREIGN PATENT DOCUMENTS 222176  5/1987  European Pat. Off. .............. 165/171

2-215098  8/1990  Japan .

OTHER PUBLICATIONS

The 4th Proceedings of Japan Society of Plasma Science & Nuclear Fusion Research, p. 100, Mar. 1987, S. Itoh, et al., "New Production of N.B.I. Electrode".

Primary Examiner—Allen J. Flanigan
Attorney, Agent, or Firm—Oblon, Spivak, McClelland, Maier & Neustadt

[57] ABSTRACT

A heat-resisting plate employed in various devices that handle high temperature plasma or high energy particles, including a metallic substrate having a cooling structure wherein cooling pipes are embedded against the substrate by a thermal spray layer of the same material as the metallic substrate on one or both faces of the metallic substrate. In forming the heat-resisting plate, the metallic substrate is processed to the form of a plate, cooling pipes are arranged on one or both faces of this metallic substrate, and the cooling pipes are fixed by spraying a thermal spray layer on the face or faces of the metallic substrate where the cooling pipes are arranged, thereby to embed the cooling pipes between the thermal spray layer and the metallic substrate.

8 Claims, 12 Drawing Sheets

HEAT-RESISTING PLATE HAVING A COOLING STRUCTURE AND METHOD OF MANUFACTURING IT

BACKGROUND OF THE INVENTION

1. Field of the Invention

This invention relates to a heat-resisting plate having a cooling structure that is employed in various types of beam devices for handling high-temperature plasma or high-energy particles, and to a method of manufacturing the heat resisting cooling plate.

2. Discussion of the Background

Examples of beam devices that handle high-temperature plasma or high-energy particles are fusion reactors or accelerators. In all such beam devices, the interior of the structural member that handles the high temperature plasma or high energy particles is exposed to extremely high temperature. A heat-resisting plate having a cooling structure is therefore employed for structural members handling such high temperature plasma or high energy particles.

A heat-resisting plate having a cooling structure may be of the type wherein the body of the heat-resisting plate is cooled by passing cooling water through cooling pipes which are mounted by brazing to the body of the heat-resisting plate, or the type wherein the body of the heat-resisting plate is cooled by passing cooling water through passages for flow of cooling water formed in the body of the heat-resisting plate.

However, a heat-resisting plate with cooling pipes mounted on it is subject to the following inconveniences. Specifically, it is difficult to mount the cooling pipes onto the heat-resisting plate body by brazing, and cracks appear in the vicinity of the mounting joint interface. This is due to the difference in the materials of the heat-resisting plate body and of the cooling pipes. Typically, the high melting point metals tungsten W or molybdenum Mo are employed for the material of the heat-resisting plate body, while stainless steel is used for the material of the cooling pipes. However, cooling pipes made of stainless steel melt when fixed securely by brazing to W or Mo plate bodies. Brazing therefore has to be performed at a temperature such that the stainless steel cooling pipes are not melted. A further problem is the occurrence of cracks in the vicinity of the brazed joint interface due to the different linear expansion coefficients of the material of the cooling pipes and the material of the heat-resisting plate body.

On the other hand, in the case of a heat-resisting plate bored with passages to allow the flow of cooling water in the heat-resisting plate body, the material of the passages and the material of the heat-resisting plate body is the same However, since tungsten W or molybdenum Mo is employed as the material of the heat-resisting plate body, there are problems regarding corrosion resistance to the cooling water.

SUMMARY OF THE INVENTION

Accordingly, one object of this invention is to provide a novel heat-resisting plate equipped with a cooling structure wherein cooling pipes can be comparatively easily mounted on the heat-resisting plate without any possibility of generation of cracks in the vicinity of the mounting joint interface, and which yet shows excellent corrosion resistance with respect to the cooling water.

A further object of this invention is to provide a method of manufacturing a heat-resisting plate having a cooling structure as described above.

These and other objects of this invention are achieved by providing a new and improved a heat-resisting plate having a cooling structure employed in high temperature portions of equipment exposed to high temperature, including a plate-shaped metallic substrate having a prescribed thickness and consisting of a metallic substrate formed of a metal selected from the group consisting of Ti, Cr, Co, Ni, Cu, Fe, Zr, Nb, Mo, Ta, W and alloys of these metals; cooling pipes for passage of cooling water arranged with prescribed spacing on one or both sides of this metallic substrate; and a thermal spray layer which is of the same material as the material of the metallic substrate and formed on the face of the metallic substrate where the cooling pipes are arranged, and is formed so as to embed the cooling pipes.

According to the present invention, there is also provided a method of manufacturing heat-resisting plate having a cooling structure employed in high temperature portions of equipment exposed to high temperature, including a substrate preparation step wherein a metallic substrate formed of a metal selected from the group of Ti, Cr, Co, Ni, Cu, Fe, Zr, Nb, Mo, Ta, W and their alloys is processed to the shape of a plate having a prescribed thickness, and arranged at a prescribed location on a production line; a cooling pipe arrangement step wherein cooling pipes are arranged at prescribed locations on the metallic substrate; a thermal spray layer formation step wherein a thermal spray layer is formed on the surface where the cooling pipes are arranged on the metallic substrate, to a degree such as to embed the cooling pipes; and a finish processing step for elimination of irregularity and warping of the thermal spray layer surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
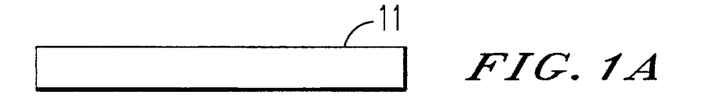
FIGS. 1A, 1B and 1C are process diagrams showing construction of a first embodiment of the heat-resisting plate of this invention.
Figure 1B:
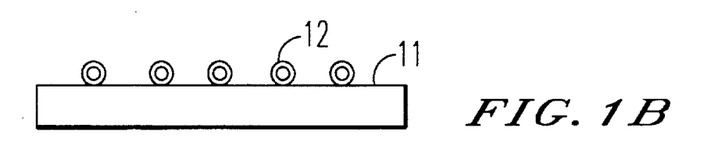
Figure 1C:
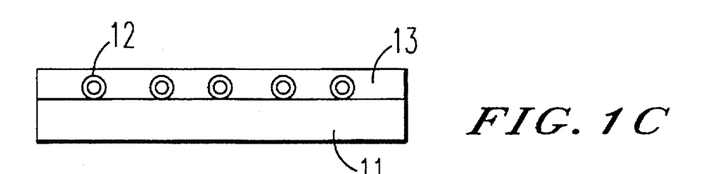

Referring now to the drawings, wherein like reference numerals designate identical or corresponding parts throughout the several views, FIGS. 1A–1C are process diagrams showing construction of a first embodiment of the heat-resisting plate of this invention, which has cooling pipes mounted an one side of the metallic substrate by thermal spraying.

In more detail, as shown in FIG. 1A, first of all, a metallic substrate 11 is processed to the form of a plate, and in arranged at a prescribed location in a manufacturing line. For this metallic substrate, Ti, Cr, Co, Ni, Cu, or Fe of period 4 of the periodic table, Zr, Nb or Mo of period 5 of the periodic table, or Ta, W of period 6 of the periodic table, or alloys of these may be employed. Hereinbelow, the use of Mo will be described.

Next, as shown in FIG. 1B, a plurality of cooling pipes 12 are arranged at prescribed positions on the upper surface of metallic substrate 11. These cooling pipes 12 are preferably arranged at equal intervals. Also, in arranging cooling pipes 12, if required, the joint faces of cooling pipes 12 contacting metal substrate 11 can be brazed. This results in more secure mounting than in the case where cooling pipes 12 are not brazed to metallic substrate 11. This brazing is to ensure that cooling pipes 12 do not move in the subsequent step of forming a thermal spray layer 23. It is not performed with the object of mounting cooling pipes 12 on to metallic substrate 11, which was the purpose of the conventional brazing. Such brazing can therefore be unelaborate and low temperature brazing is sufficient. There is therefore no possibility of such brazing melting cooling pipes 12 or of generating cracks in the vicinity of the brazing joint interface. Hereinbelow, such "brazing" will refer to low temperature brazing.

As shown in FIG. 1C, when arrangement of the cooling pipes 12 on to metallic substrate 11 is completed, mounting of cooling pipes 12 on to metallic substrate 11 is performed by thermal spraying. In more detail, thermal spray layer 121 is formed to a depth such as to embed cooling pipes 12 on the face of metallic substrate 11 on which cooling pipes 12 are arranged. This formation of thermal spray layer 13 embeds cooling pipes 12 in thermal spray layer 13, thereby securely mounting cooling pipes 12 on metallic substrate 11. Formation of thermal spray layer 13 is performed by plasma spraying. The material of thermal spray layer 13 is the same as that of metallic substrate 11. In this first embodiment, metallic substrate 11 consists of Mo, so thermal spray layer 13 in also formed of Mo.

Figure 2:
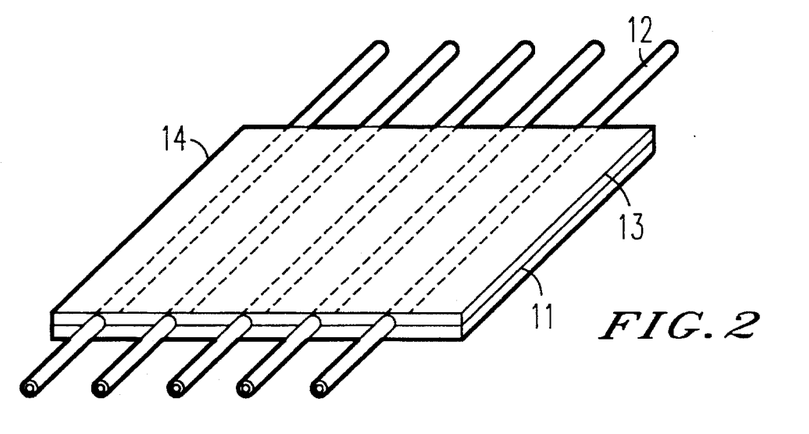
FIG. 2 is a perspective view of a heat-resisting plate according to a first embodiment of this invention.

Formation of heat-resisting plate 14 prior to finish processing is performed by formation of thermal spray layer 13 on metallic substrate 11. Prior to finish processing, the thermal spray layer surface of heat-resisting plate 14 contains irregularities and shows warping due to the thermal spraying. Finish processing is therefore performed so as to eliminate the warping of heat-resisting plate 14 to eliminate irregularities of the thermal spray layer surface. FIG. 2 is a perspective view showing a heat-resisting plate 14 of this invention formed in this way.

Since heat-resisting plate 14 according to this first embodiment has cooling pipes 12 mounted onto metallic substrate 11 by thermal spraying, there is no possibility of cracks being generated in the vicinity of the brazing joint interface.

Figure 3:
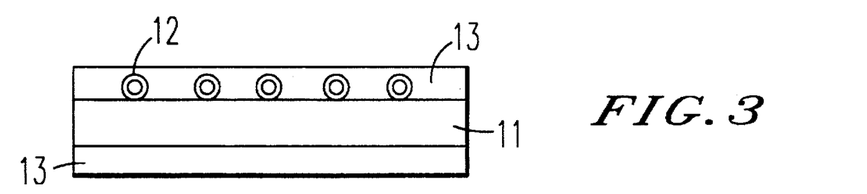
FIG. 3 is an end view of an embodiment in the case where a thermal spray layer is provided on the back face of a heat-resisting plate according to the first embodiment.

This thermal spraying produces warping of the heat-resisting plate 14 before finish processing. In order to alleviate this warping, as shown in FIG. 3, a thermal spray layer 13 is formed on the opposite face of metallic substrate 11 to that on which metallic pipes 12 are mounted. The warping produced by thermal spraying can thereby be alleviated.

FIGS. 4A–4D are process diagrams showing a second embodiment of this invention. In this second embodiment, Mo is employed as metallic substrate 11 as in the first embodiment, and cooling pipes 12 are mounted by thermal spraying on the front face of metallic substrate 11. The difference with respect to the first embodiment lies in that, in the arrangement of cooling pipes 12, recesses 15 are provided for the arrangement of cooling pipes 12, maintaining a prescribed spacing on the front face of metallic substrate 11.

Figure 4A:
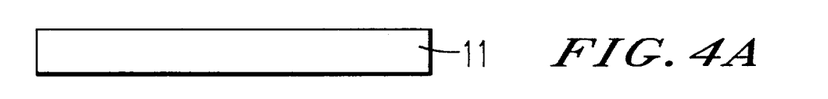
FIGS. 4A, 4B, 4C and 4D are process diagrams showing construction of a second embodiment of a heat-resisting plate according to this invention.
Figure 4B:
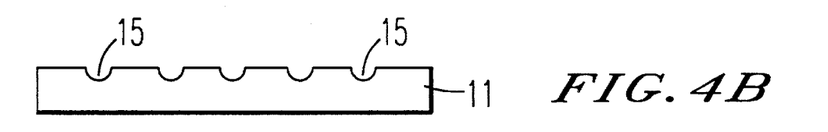
Figure 4C:
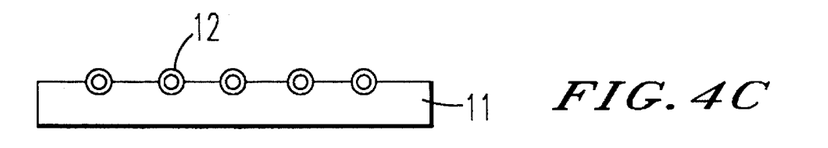
Figure 5:
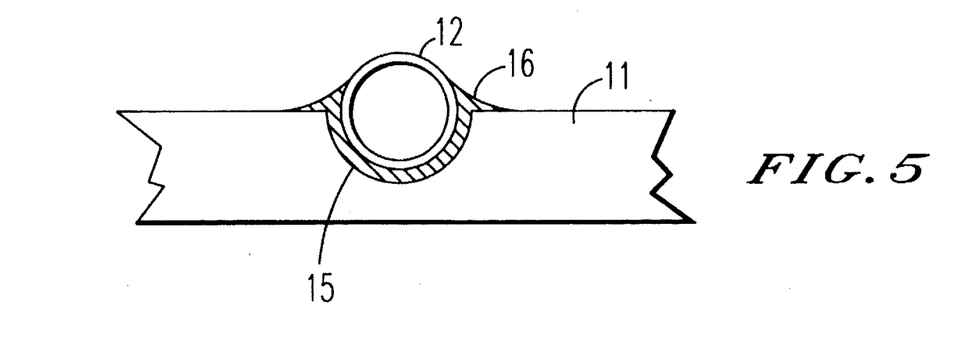
FIG. 5 is an end view partly in cross-section of brazing of a cooling pipe in the second embodiment.

Specifically, an shown in FIG. 4A, as in the first embodiment, a metallic substrate 11 is prepared by processing to a plate shape. Then, as shown in FIG. 4B, recesses 15 are provided for the arrangement of cooling pipes 12 maintaining a prescribed spacing on the front face of metallic substrate 11. Cooling pipes 12 are then arranged in these recesses 15 as shown in FIG. 3C. In this case, as in the first embodiment, if required, the surfaces where cooling pipes 12 join metallic substrate 11 can be brazed. FIG. 5 illustrates such brazing. Brazing is carried out with the introduction of brazing material 16 between cooling pipes 12 and recesses 15 provided in metallic substrate 11. Arrangement of cooling pipes 12 on metallic substrate 11 can thereby be made more secure than if brazing is not performed. As mentioned above, since such brazing is low temperature brazing, there is no possibility of cooling pipes 12 melting, or of generation of cracks in the vicinity of the mounting joint interface.

Figure 4D:
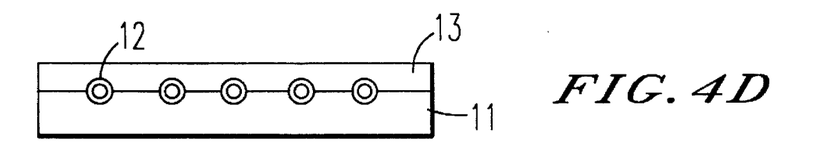

Next, mounting of cooling pipes 12 on to metallic substrate 11 in performed by thermal spraying in the same way as in the first embodiment. Specifically, as shown in FIG. 4D, thermal spray layer 13 is formed on the face of metallic substrate 11 where cooling pipes 12 are arranged, to a degree sufficient to embed cooling pipes 12. This formation of thermal spray layer 13 results in secure mounting of cooling pipe 13 on the metallic substrate 11, owing to the embedding of cooling pipes 12 in thermal spray layer 13. Formation of thermal spray layer 13 is achieved by plasma spraying. For the material of the thermal spray layer 13, the same material as metallic substrate 11 is employed. Since, in this first embodiment, metallic substrate 11 is made of Mo, thermal spray layer 13 is also formed of Mo.

Forming of thermal spray layer 13 onto metallic substrate 11 completes the formation of heat-resisting plate 14 apart from finish processing. Prior to finish processing, heat-resisting plate 14 has irregularities in the upper surface of the thermal spray layer and warping produced by the thermal spraying. Finish processing is performed in order to eliminate warping of this unfinished heat-resisting plate 14 and irregularities of the surface of the thermal spray layer.

Figure 6:
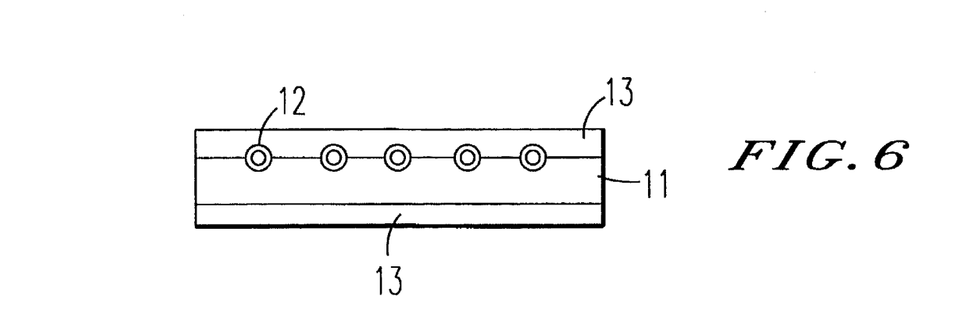
FIG. 6 is an end view of an embodiment in the case where a thermal spray layer is provided on the back face of a heat-resisting plate according to the second embodiment.

Since the thermal spraying produces warping in the heat-resisting plate 14 prior to finish processing, as shown in FIG. 6, a thermal spray layer 13 may be formed on the back face of metallic substrate 11 opposite to the side on which metallic pipes 12 are mounted, in order to alleviate such warping. The warping due to thermal spraying can thereby be alleviated.

Next, FIGS. 7A-7E are process diagrams showing a third embodiment of this invention. This third embodiment is the same as the first embodiment in that Mo is employed an the metallic substrate 11 and in that cooling pipes 12 are mounted by thermal spraying on the front face of metallic substrate 11. However, it differs from the first embodiment in that cooling pipes 12 are also mounted by thermal spraying on the back face of metallic substrate 11. That is, cooling pipes 12 are mounted by thermal spraying on both faces of metallic substrate 11.

Figure 7A:
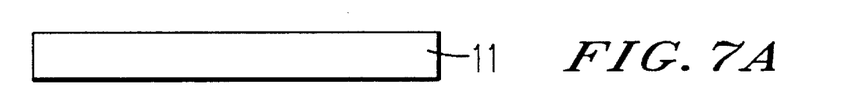
FIGS. 7A–7E are process diagrams showing construction of a third embodiment of a heat-resisting plate according to this invention.
Figure 7B:
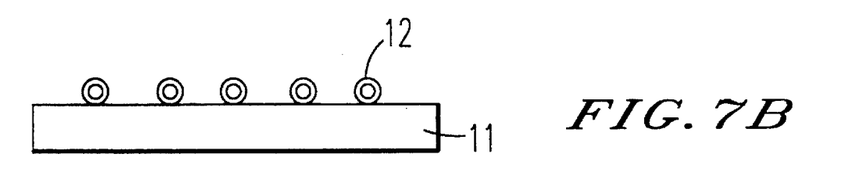
Figure 7C:
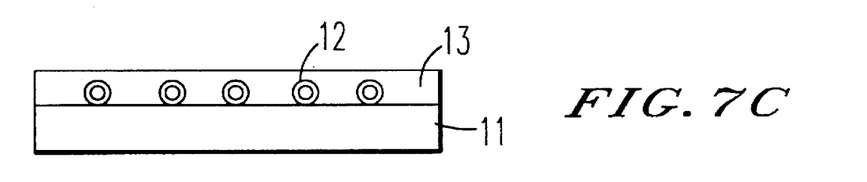
Figure 7D:
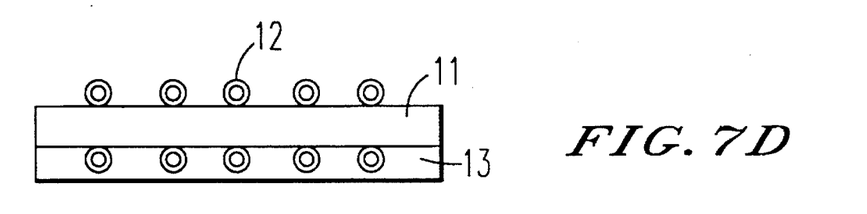
Figure 7E:
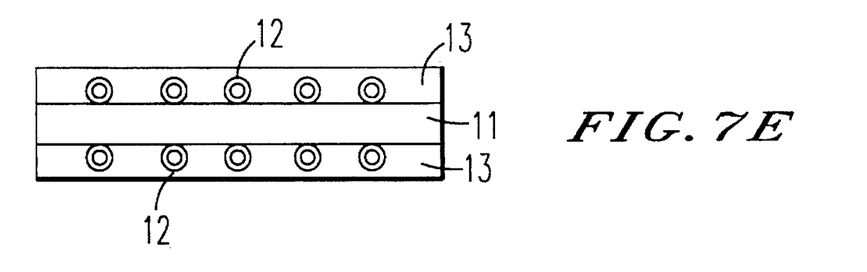

In the same way as in the first embodiment, a plate-shaped metallic substrate 11 is prepared as shown in FIG. 7A and cooling pipes 12 are arranged on the front face of metallic substrate 11 as shown in FIG. 7B. These cooling pipes 12 are then mounted by thermal spraying an shown in FIG. 7C. Then, as shown in FIG. 7D, cooling pipes 12 are arranged also on the rear face of metallic substrate 11 and, as shown in FIG. 7E, these cooling pipes 12 arranged on the rear face of metallic substrate 11 are also mounted by thermal spraying. After this, finish processing is performed.

It is not necessarily essential for the number of cooling pipes 12 arranged on the back face to be identical with the number of cooling pipes 12 mounted on the front face, but it is preferable that they should be the same number. As in the case of the first embodiment, in the arrangement of cooling pipes 12, the face of cooling pipes 12 contacting metallic substrate 11 may be attached by low temperature brazing. The same material is used for both the metallic substrate 11 and thermal spray layer 13, e.g. Mo.

Figure 8:
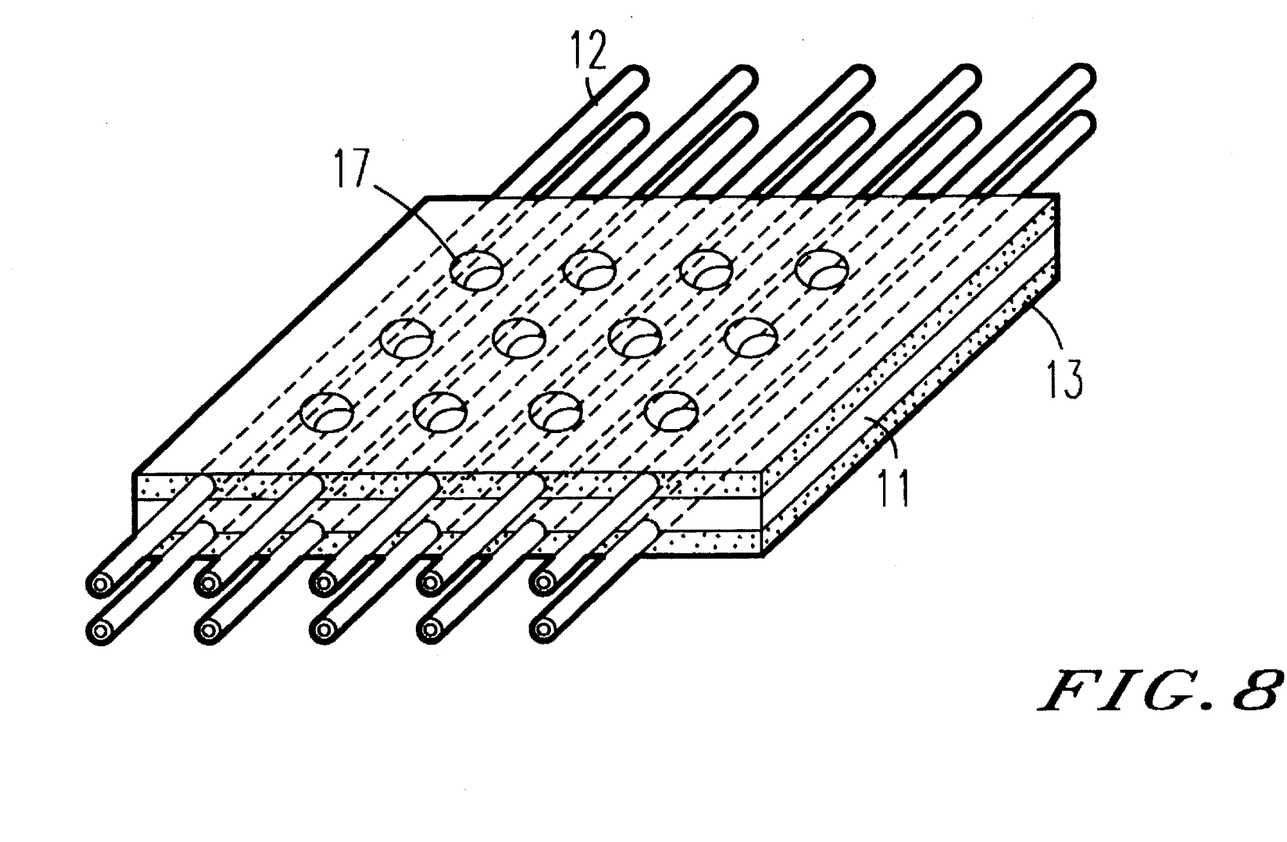
FIG. 8 is a perspective view of a heat-resisting plate according to the third embodiment.

FIG. 8 is a perspective view of a heat-resisting plate 14 obtained in this way. Heat-resisting plate 14 shown in FIG. 8 is a heat-resisting plate employed as the accelerating electrode of an accelerator. A plurality of through-holes 17 are therefore provided in this heat-resisting plate 14 to permit passage of accelerated particles. In cases where it is not necessary to permit passage of accelerated particles, there is no need to provide through-holes 17 in heat-resisting plate 14.

With this third embodiment, the amount of warping of heat-resisting plate 14 prior to finish processing can be reduced, owing to the mounting of cooling pipes 12 on both faces of metallic substrate 11. In particular, if the same number of cooling pipes 12 is arranged on both faces, and the thickness of thermal spray layer 13 is the same, warping of heat-resisting plate 14 prior to finish processing can be practically eliminated.

Figure 9A:
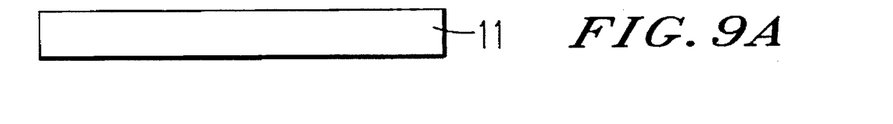
FIGS. 9A–9F are process diagrams showing construction of a fourth embodiment of a heat-resisting plate according to this invention.

FIGS. 9A-94 are process diagrams showing a fourth embodiment of this invention. This fourth embodiment is the same as the third embodiment in that Mo is employed as metallic substrate 11 and cooling pipes 12 are mounted on both faces of metallic substrate 11 by thermal spraying. The difference from the third embodiment lies in that, in arrangement of cooling pipes 12, recesses 15 are provided on both faces of metallic substrate 11 for arrangement of cooling pipes 12 to maintain prescribed spacing.

Figure 9B:
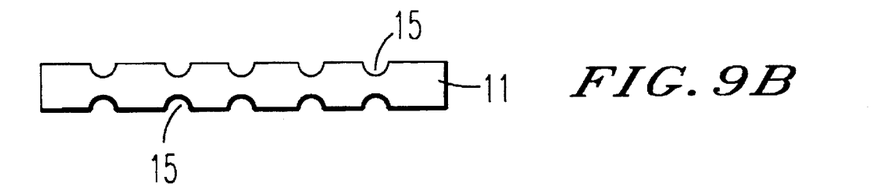
Figure 9C:
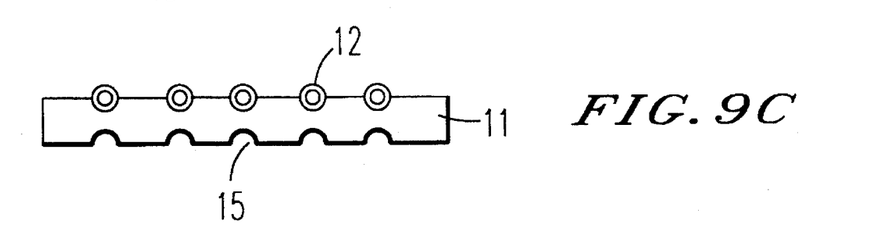
Figure 9D:
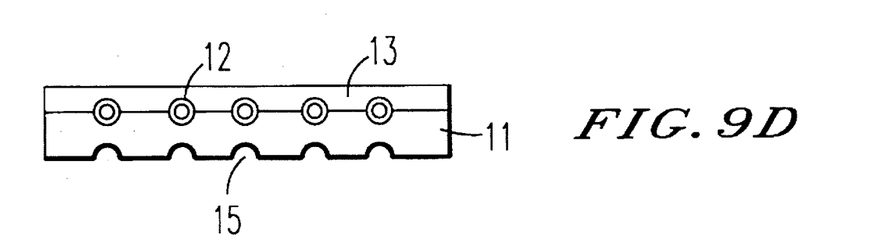
Figure 9E:
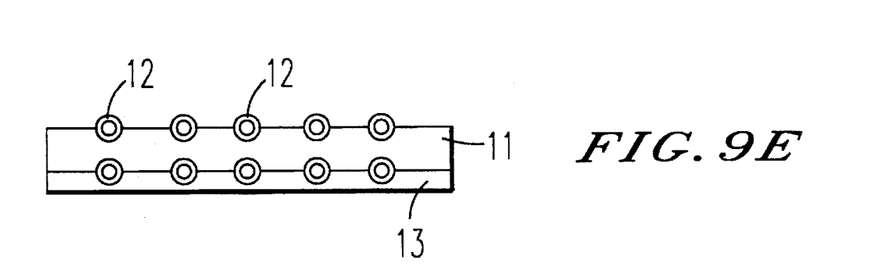
Figure 9F:
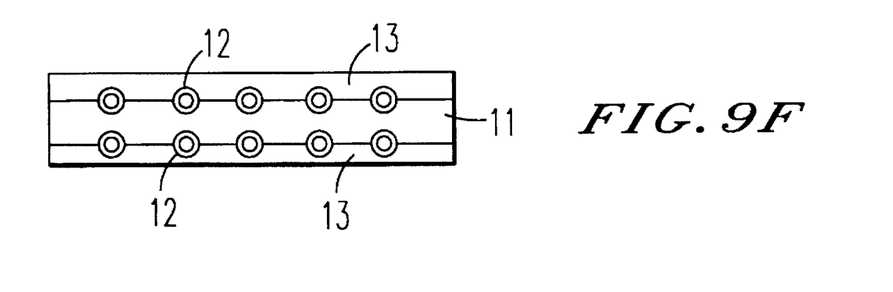

In this fourth embodiment also, like the third embodiment, a plate-shaped metallic substrate 11 is provided as shown in FIG. 9A. Then, as shown in FIG. 9B, recesses 15 are provided for arrangement of cooling pipes 12 on both faces of metallic substrate 11. As shown in FIG. 9C, cooling pipes 12 are arranged in recesses 15 on the front face of metallic substrate 11 and, as shown in FIG. 9D, cooling pipes 12 are mounted on the front face of metallic substrate 11 by thermal spraying. After this, as shown in FIG. 9E, cooling pipes 12 are arranged also in recesses 15 on the back face of metallic substrate 11, and, as shown in FIG. 9F, cooling pipes 12 arranged an the back face of metallic substrate 11 are also mounted by thermal spraying. After this, finish processing is performed.

It is not essential for the number of cooling pipes 12 arranged on the back face to be the same as the number of cooling pipes 12 mounted on the front face, but it is desirable that their number should be the same. The same material, for example, Mo, is employed as the material of metallic substrate 11 and thermal spray layer 13.

Figure 10:
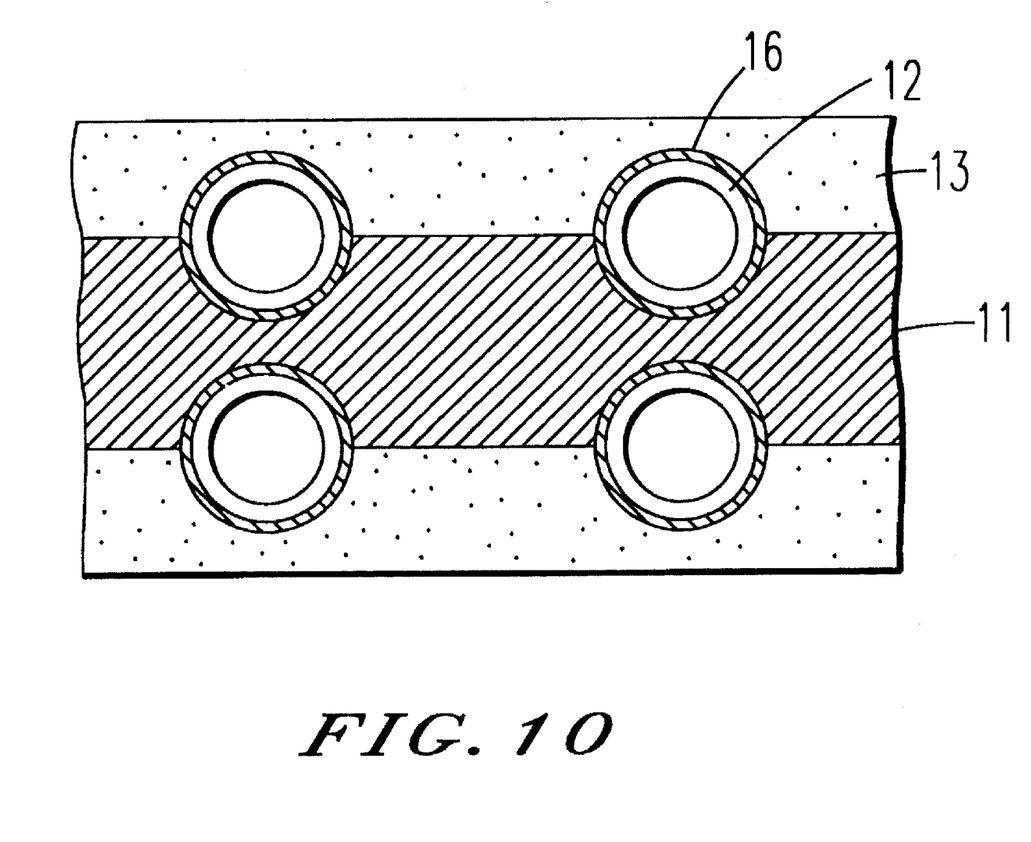
FIG. 10 is a partial cross-sectional view of an embodiment in the case where brazing material is coated on to the cooling pipes of the fourth embodiment.

Regarding the arrangement of cooling pipes 12, as in the third embodiment, if required, the joint faces where cooling pipes 12 contact metallic substrate 11 may be attached by low temperature brazing. This low temperature brazing can be as shown in FIG. 5. However, it is alternatively possible, as shown in FIG. 10, to apply a coating of brazing material 16 beforehand to the circumferential surfaces of cooling pipes 12. Ni is employed as brazing material 16. Brazing material 16 thereby serves the purpose of providing a heat stress relaxation agent between metallic substrate 11 and cooling pipes 12 and between thermal spray layer 13 and cooling pipes 12.

With this fourth embodiment, in addition to the benefits of the third embodiment, mispositioning of cooling pipes 12 when thermal spraying is performed is eliminated.

Figure 11:
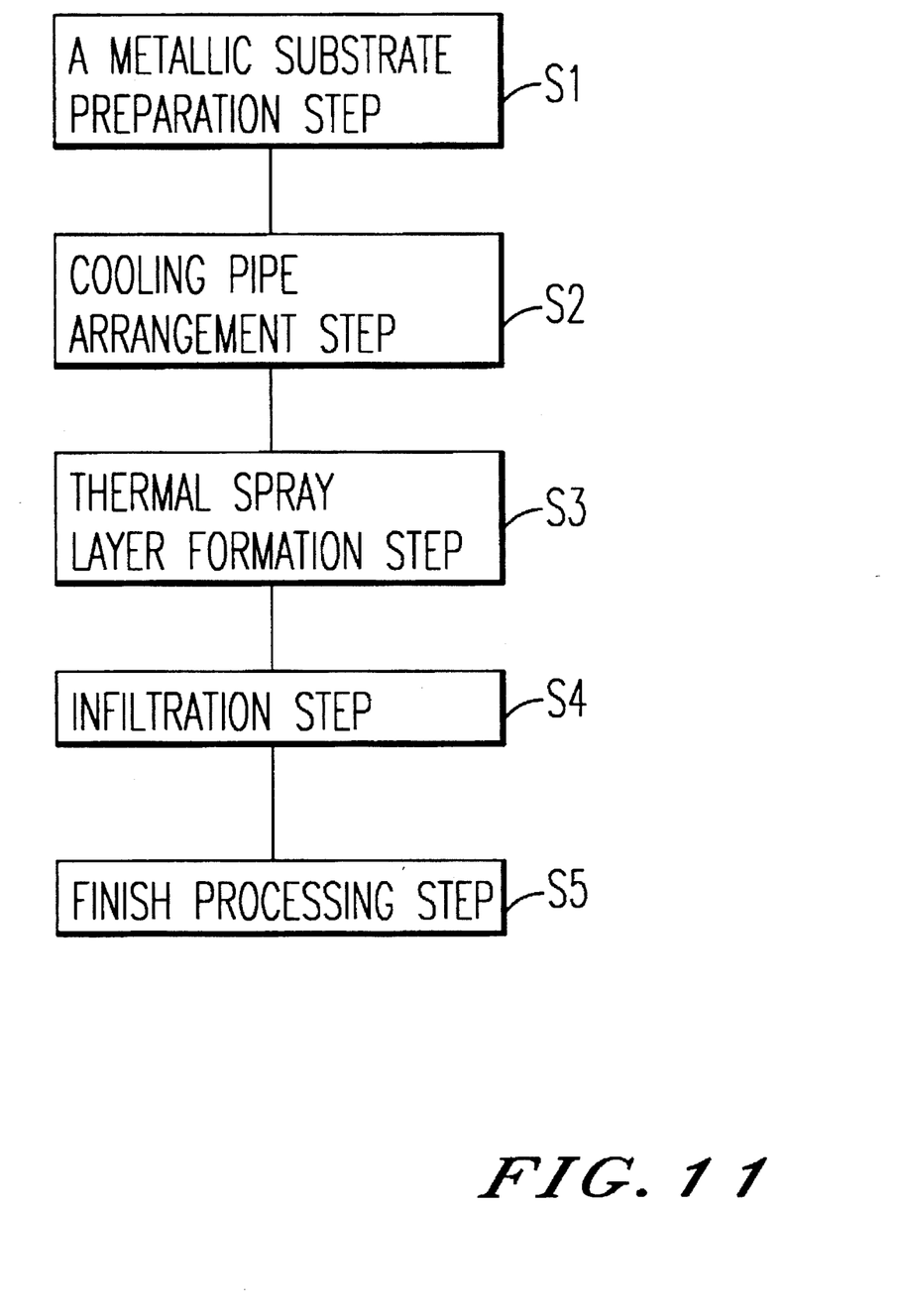
FIG. 11 is a flow chart showing an embodiment of a method of manufacturing the heat-resisting plate of this invention.

Next, FIG. 11 is a flow chart showing an embodiment of the method of manufacturing the heat-resisting plate of this invention. In more detail, the method of manufacturing heat-resisting plate according to this embodiment includes a metallic substrate preparation step S1, a cooling pipe arrangement stop S2, a thermal spray layer formation step S3, an infiltration step S4, and a finish processing step S5.

In metallic substrate preparation step S1, metallic substrate 11 is processed to plate shape, and positioned at a prescribed location on a production line. As this metallic substrate, Ti, Cr, Co, Ni, Cu and Fe of the fourth period of the periodic table, Zr, Nb, Mo of the fifth period of the periodic table, and Ta and W of the sixth period of the periodic table, and alloys of these, can be employed.

In cooling pipe arrangement step S2, a plurality of cooling pipes 12 are arranged in prescribed positions on metallic substrate 11. In the arrangement of these cooling pipes 12, if required, recesses 15 may be provided for arrangement of cooling pipes 12. Also, if required, the joint surface of cooling pipes 12 may be brazed to metallic substrate 11. The circumferential surface of cooling pipes 12 may be coated beforehand with brazing material 16. Preferably, cooling pipes 12 are arranged with equal spacing. Cooling pipes 12 may be positioned on one face or both faces of metallic substrate 11.

In thermal spray forming stop S3, the cooling pipes 12 are mounted on metallic substrate 11 by thermal spraying. That is, a thermal spray layer 13 is formed on metallic substrate 11 to a degree sufficient to embed cooling pipes 12 on the surface on which cooling pipes 12 are arranged. By this formation of thermal spray layer 13, cooling pipes 12 are embedded in thermal spray layer 13, thereby securely mounting cooling pipes 12 on metal substrate 11. Thermal spray layer 13 is formed by plasma spraying. The material used for thermal spray layer 13 is the same as the material of metallic substrate 11.

In infiltration step S4, the infiltration material, which is a low melting point heat conductive material, is deposited on thermal spray layer 13 by an infiltration process. The reason for performing an infiltration step is to eliminate pores 18 and/or cracks 19 formed in the interior of thermal spray layer 13. That is, in the thermal spray layer 13 formed by plasma spraying by thermal spray equipment 20 shown in FIG. 12, pores 18 or cracks 19 are present, and pores 18 due to poor adhesion are also present at the periphery of cooling pipes 12. Thermal spray layer 13 is therefore infiltrated with a low melting point heat conductive material in order to eliminate these pores 18 or cracks 19. For such infiltration material Cu, Ag, Pb or Al etc. may be used.

Figure 12:
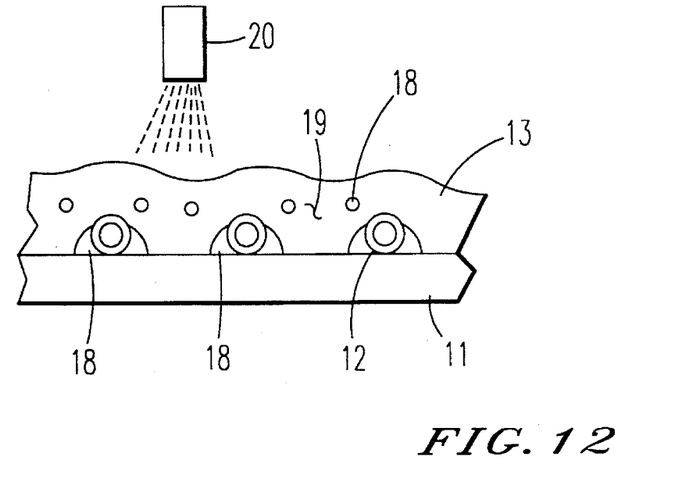
FIG. 12 is an illustration of thermal spray layer formation.

In the experiments carried out by the inventors, the density of thermal spray layer 13 obtained by plasma spraying was normally about 85% to 95% of the density of metallic substrate 11. In other words, it contained about 5% to 15% pores 18 or cracks 19. Furthermore, on examining these pores 18 or cracks 19 by the mercury pressure method, it was found that 88% to 98% of pores 18 or cracks 19 were open pores or cracks connected to the outside. This shows that pores 18 or cracks 19 can conveniently be filled in by a subsequent step of infiltration of an infiltration material. Also it was found that, in the plasma spraying process, pores 18 are generated in the region between the cooling pipes 12 and metallic substrate 11 where the thermal spray material cannot penetrate. These pores 18 are also open pores.

Figure 13:
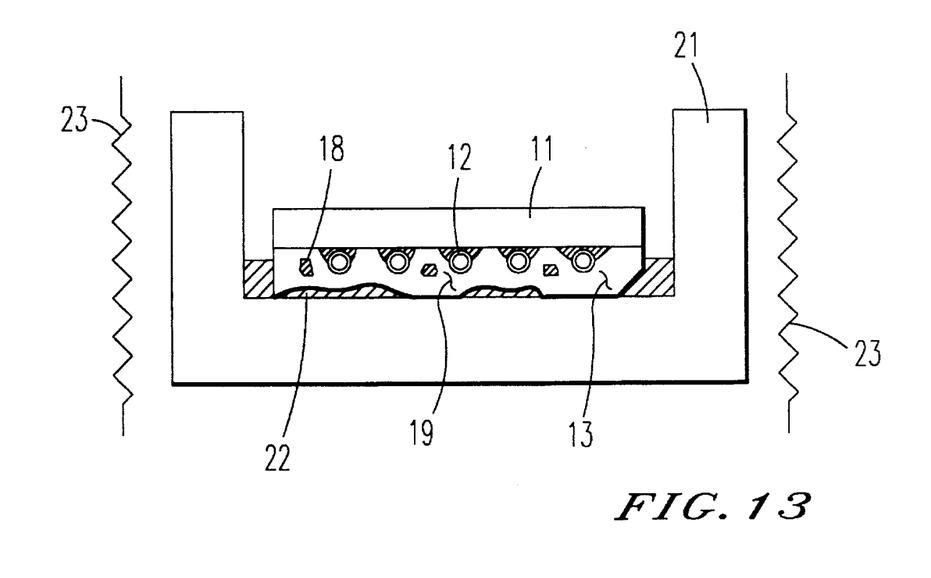
FIG. 13 is an illustration of infiltration.

FIG. 13 illustrates infiltration of thermal spray layer 13 in infiltration material. First of all, infiltration material 22 is spread on the bottom of a crucible 21 in a hydrogen atmosphere for infiltration. Then, heat-resisting plate 14 prior to finish processing is placed in crucible 21 with thermal spray layer 13 facing downwards. Heating is then performed by a heater 23 up to a temperature sufficient to melt infiltration material 22, e.g. 1100° C. Wettability with the molten infiltration material 22 is thereby improved, since the oxide present on the metallic substrate 11 and contained in the thermal spray layer 3.3 is decomposed. Infiltration material 22 therefore penetrates into pores 18 and cracks 19 in thermal spray layer 13 by capillary action, with the result that pores 18 and cracks 19 are filled with infiltration material 22. The strength of thermal spray layer 13 is improved since infiltration material 22 has high ductility.

In finish processing step S5, finish processing is performed in order to eliminate irregularities of the surface of thermal spray layer 13 by removing unrequired infiltration material 22 adhering to metallic substrate 11. Irregularities are produced when infiltration is performed due to adhesion of excess infiltration material 22 to metallic substrate 11, and also in the surface of thermal spray layer 13 that is used to mount cooling pipes 12 by thermal spraying. Finish processing is therefore performed to eliminate these.

Figure 14:
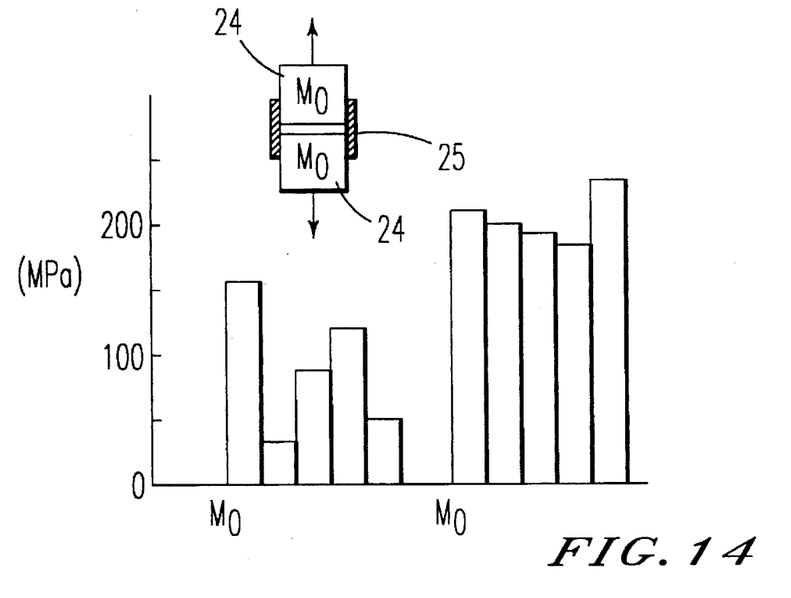
FIG. 14 is a graph of the tensile strength performance of the sprayed coating.

Next, FIG. 14 shows the tensile strength performance of thermal spray layer 13. The experimental method for measurement of this tensile strength was to superimpose end-to-end two Mo mandrels 24 of diameter 45 mm and length 50 mm, forming a sprayed coating 25 of width 80 mm, thickness 2 mm on the circumferential surface around this superimposed portion, and to measure the tensile strength (Npa) by applying respective forces F (9807 N/Min) in the directions of the arrows. FIG. 14 shows the results of measurement performed five times on sprayed coating 25 respectively for the case where only a Mo sprayed coating was provided and for the came where the Mo sprayed coating was infiltrated with Cu. It can be seen that in the case where the coating was a Mo sprayed coating only, the tensile strength was lower and its variability was greater than in the case where the Mo sprayed coating was infiltrated with Cu.

Figure 15:
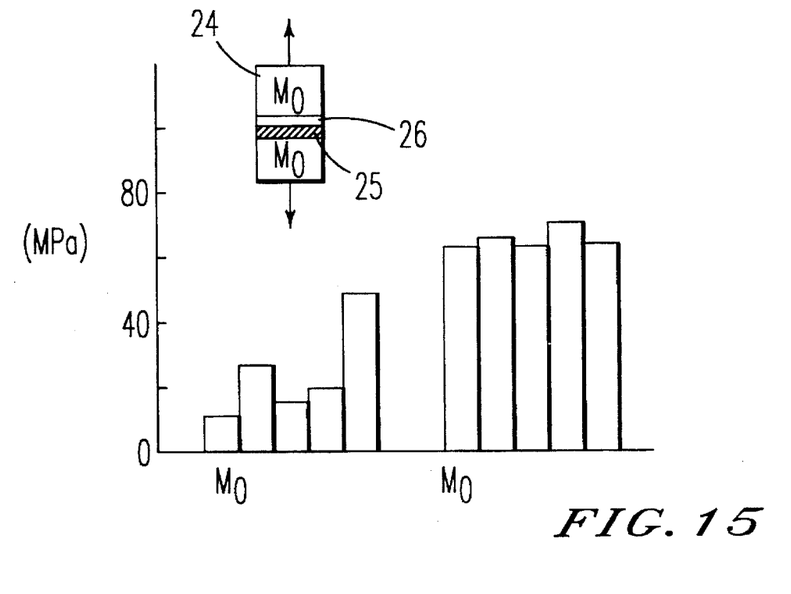
FIG. 15 is a graph of the adhesion strength performance of the sprayed coating.

FIG. 15 shows a graph of the adhesion strength of thermal spray layer 13. The experimental method of finding this adhesion strength was to prepare two Mo mandrels 24 of diameter 40 mm, length 40 mm, forming a sprayed coating 25 of 0.5 mm on one of the Mo mandrels 24, and to mount the other Mo mandrel 24 on this portion using epoxy adhesive 26.

The adhesive strength (Npa) was then measured by applying respective forces F (9807 N/min) in the directions of the arrows. FIG. 15 shows the results of measurements in respect of a sprayed coating 25 performed five times, respectively for the case of Mo sprayed coating only, and for the case where a Mo sprayed coating was infiltrated with Cu. As shown in FIG. 15, the behavior of the adhesive strength was the same as that of the tensile strength in that the adhesive strength was lower and its variability greater for a coating consisting only of Mo sprayed coating than for a coating consisting of Mo sprayed coating subjected to Cu infiltration.

Figure 16:
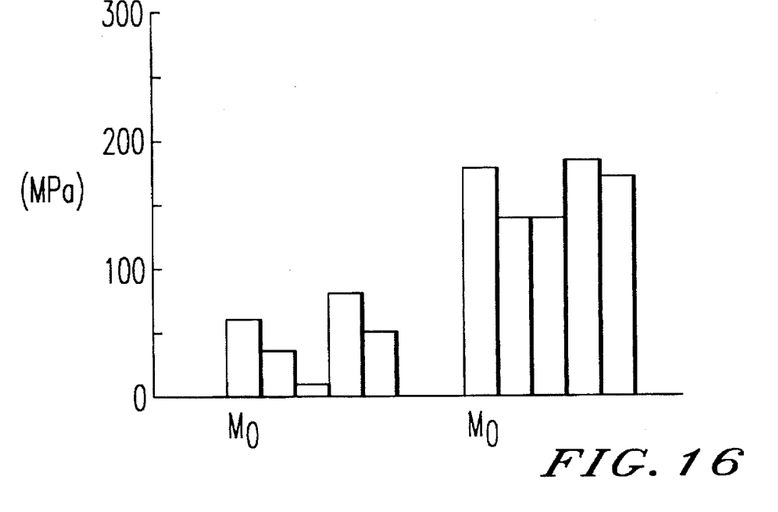
FIG. 16 is a graph showing the thermal conductivity performance of heat-resisting plate according to this invention.

FIG. 16 said graph showing the thermal conductivity performance of a heat-resisting plate 14. The ordinate shows the thermal conductivity (W/m.K), while the abscissa shows the results of five measurements in each case using respectively a Mo thermal spray layer only, and a Mo thermal spray layer infiltrated with Cu. It can be seen that in the case of this thermal conductivity performance also, the performance of a heat-resisting plate with a Mo thermal spray layer infiltrated with Cu is raised, and variability of the performance is reduced.

Figure 17:
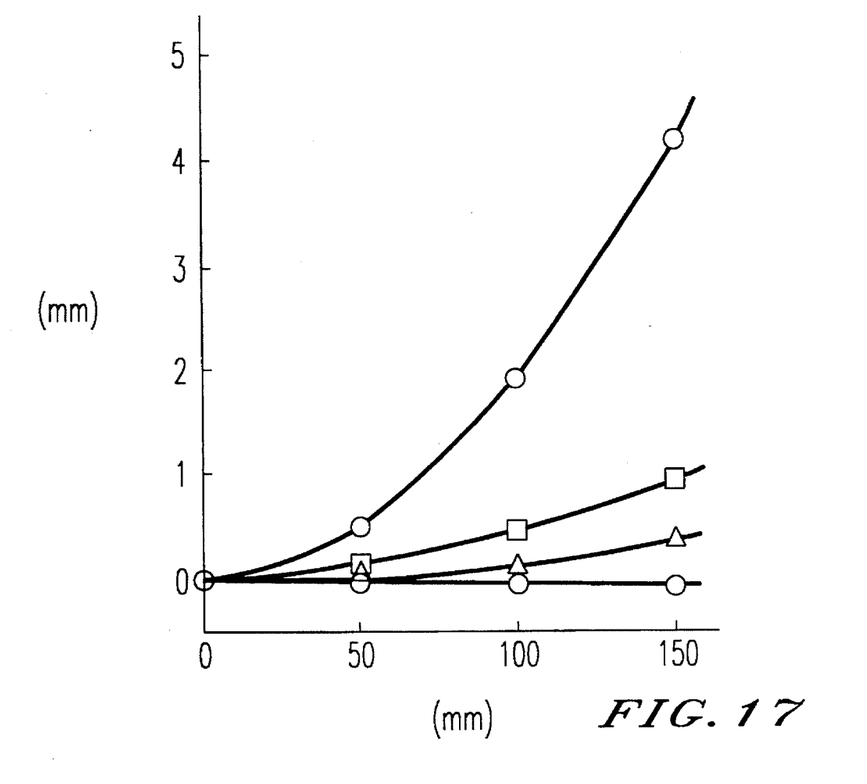
FIG. 17 is a graph showing the warping performance of heat-resisting plate according to this invention.

Next, FIG. 17 is a graph showing the warping performance of a metallic substrate 11 formed with a thermal spray layer 13. Specifically, FIG. 17 shows a warp performance of heat-resisting plate 14 when provided with various different thermal spray layers 13 on a metallic substrate 11 of thickness 4 mm, size 300 mm×300 mm. The central area of heat-resisting plate 14 was taken as the reference position, and the height of the edge portions of heat-resisting plate 14 relative to this reference position was measured; this is the deformation amount. The deformation amount (mm) is shown along the ordinate, while the distance from the reference position at the center of heat-resisting plate 14 is shown along the abscissa.

Characteristic curve C1 Is the characteristic curve for an embodiment in which cooling pipes 12 are mounted by thermal spray layer 13 on one face of metallic substrate 11, an shown in FIGS. 1A–1C or FIGS. 4A–4D. Characteristic curve C2 is a characteristic curve for an embodiment in which cooling pipes 12 are mounted by thermal spray layer 13 on one face of metallic substrate 11, as shown in FIG. 3 or FIG. 6, and a thermal spray layer 13 of half the thickness of the thermal spray layer 13 on the front face is formed on the back face. Characteristic curve C3 is the characteristic curve of an embodiment in which cooling pipes 12 are mounted by thermal spray layer 13 on one face of metallic substrate 11, as shown in FIG. 3 or FIG. 6, and a thermal spray layer 13 of the same thickness as the thermal spray layer 13 on the front face is formed on the back face. Characteristic curve C4 is the characteristic curve of an embodiment in which cooling pipes 12 are mounted by thermal spray layer 13 on both faces of metallic substrate 11 as shown in FIG. 7 or FIG. 9.

As can be seen from these characteristic curves, in order to perform without difficulty finish processing to eliminate warp generated in heat-resisting plate 14, it is desirable to provide a thermal spray layer on the back face when cooling pipes 12 are mounted by thermal spray layer 13 on only one face of metallic substrate 11, or to mount cooling pipes 12 by thermal spray layer 13 on both faces of metallic substrate 11.

Figure 18:
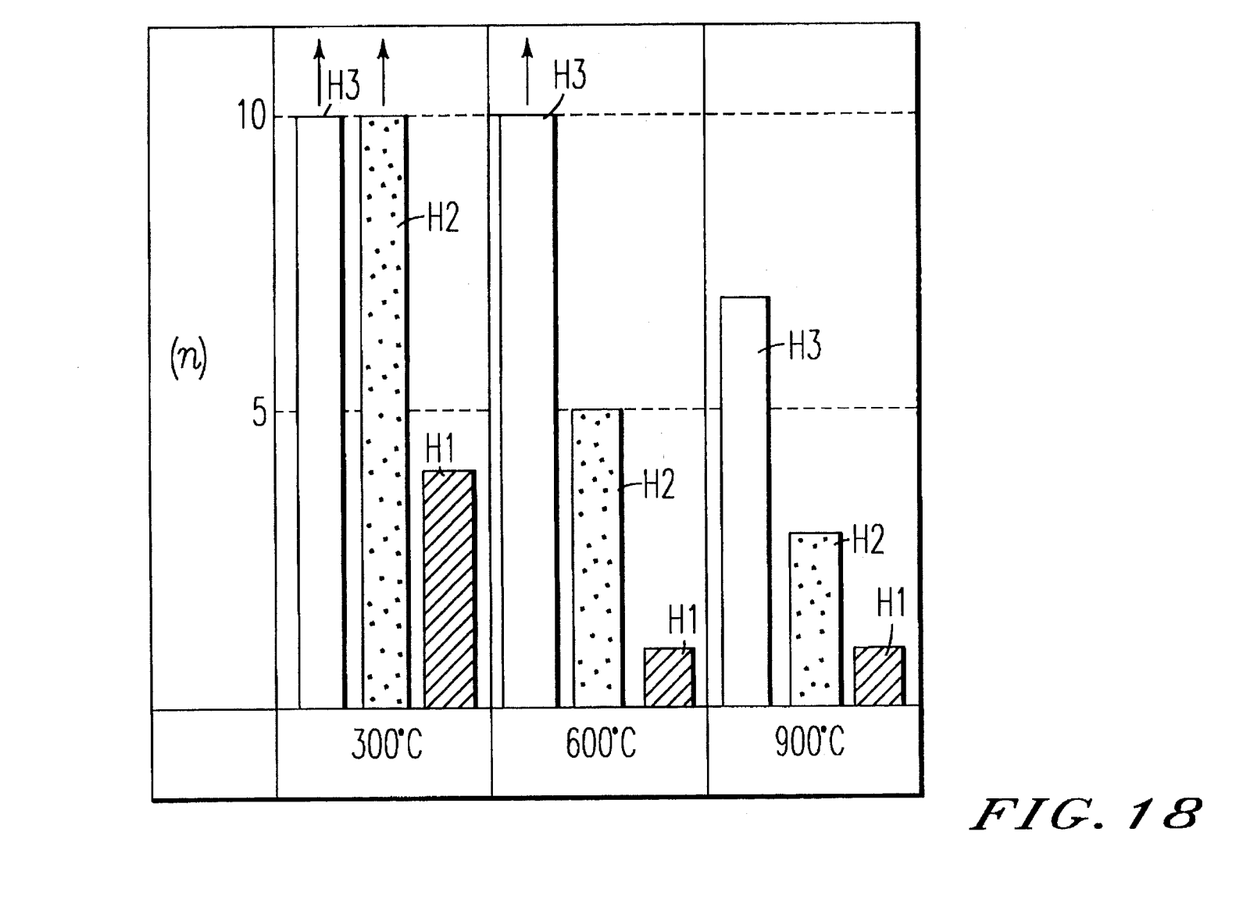
FIG. 18 is a graph showing the heat-resisting cycle performance of heat-resisting plate according to this invention.

FIG. 18 is a graph showing the heat-resisting cycle performance of a heat-resisting plate 14. H1 is the performance of a heat-resisting plate 14A wherein cooling pipes 121 are mounted by thermal spray layer 13 on both faces of metallic substrate 11. H2 is the performance of heat-resisting plate 14B wherein the circumferential surfaces of cooling pipes 12 are precoated with Ni as a brazing material, and such cooling pipes 12 are mounted on both faces of metallic substrate 11 by thermal spray layer 13. H3 is the performance of a heat-resisting plate 14C wherein the circumferential surfaces of cooling pipes 12 are coated beforehand with Ni as a brazing material, these cooling pipes 12 are mounted on both faces of metallic substrate 11 by means of thermal spray layer 13, and wherein through-holes 17 are provided in metallic substrate 11.

The heat-resisting cycle test in performed by intermittently heating the upper faces of these heat-resisting plates 14A, 14B and 14C while flowing cooling water in cooling pipe 12 of these heat-resisting Plates 14A, 14B and 14C. Specifically, the temperature of the front faces of heat-resisting plates 14A, 14B and 14C is raised to the prescribed temperatures, when this is reached, heating is stopped, and heating is again performed when the temperature has reached the value which it had when heating was commenced. This heating and cessation of heating are carried out repetitively in sequence. The number of times of heating until leakage occurs of the cooling water flowing through cooling pipes 12 is determined Tests were performed with prescribed temperatures of 300° C., 600° C. and 900° C.

The result was that although heat-resisting plate 14A could withstand four heating cycles at 300 ° C, in the case of heating to 600° C. and 900° C., cooling pipes 12 showed cracks after a single cycle, resulting in leakage of cooling water. Heat-resisting plate 14B showed no leakage of cooling water for ten heating cycles at 300° C., and was able to withstand five cycles at 600° C. and three heating cycles at 900° C. Heat-resisting plate 14C showed no leakage of cooling water for ten heating cycles at 300° C. and 600° C., and was able to withstand seven cycles at 900° C.

As can be seen from these characteristics, the heat-resisting cycle performance was improved by performing coating with the brazing material Ni on the circumferential surface of cooling pipes 12 of heat-resisting plate 14. Also, the heat-resisting cycle performance of heat-resisting plate 14 provided with through-holes 17 was even further improved. However, heat-resisting plates 14 provided with, through-holes 17 in metallic substrate 11 are restricted to applications which require through-holes 17 e.g. for use as the electrode of an accelerator.

As described above, according to this invention, the cooling pipes are mounted by thermal spraying onto the metallic substrate, so the cooling pipes can be mounted comparative 14 easily onto the metallic substrate. Specifically, there is no possibility of cracks being generated in the vicinity of the mounting joint interface, nor of the cooling pipes being melted. Also, since good adhesion can be obtained between the cooling pipes and thermal spray layer, large heat-resisting plates can be manufactured. Furthermore, since the cooling water flows through cooling pipes which are separate from the metallic substrate, heat-resisting plates of excellent corrosion resistance to cooling water can be obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Heat-resisting plate for use in high temperature portions of equipment exposed to high temperature, comprising:

a plate-shaped metallic substrate having a prescribed thickness, this metallic substrate formed of a metal selected from the group consisting of Ti, Cr, Co, Ni, Cu, Fe, Zr, Nb, Mo, Ta, and W, and alloys thereof;

cooling pipes arranged with prescribed spacing on at least one face of said metallic substrate, for the passage of cooling water; and a thermal spray layer of the same material as that of the metallic substrate formed on said at least one face of said metallic substrate and on said cooling pipes with a thickness greater than a protrusion of said cooling pipes from said at least one face of said substrate such as to embed said cooling pipes between said thermal spray layer and said substrate.

2. Heat-resisting plate according to claim 1, wherein said metallic substrate comprises:

recesses provided with prescribed spacing on one side of said metallic substrate, said cooling pipes being arranged in said recesses.

3. Heat-resisting plate according to claim 1, comprising:

a thermal spray layer of the same material as the material of said metallic substrate formed on a face of said metallic substrate opposite said at least one face.

4. Heat-resisting plate according to claim 2, comprising:

a thermal spray layer of the same material as the material of said metallic substrate formed on a face of said metallic substrate opposite said at least one face.

5. Heat-resisting plate for use in high temperature portions of equipment exposed to high temperature, comprising:

a plate-shaped metallic substrate having a prescribed thickness, said metallic substrate consisting of a metal selected from the group consisting of Ti, Cr, Co, Ni, Cu, Fe, Zr, Nb, Mo, Ta, and W, and alloys thereof;

cooling pipes arranged with prescribed spacing on both a front face and a back face of said metallic substrate, for the passage of cooling water; and metallic thermal spray layers of the same material as the material of said metallic substrate formed on both the front face and the back face of said metallic substrate where said cooling pipes are arranged such as to embed said cooling pipes.

6. Heat-resisting plate according to claim 5, comprising:

recesses having a prescribed spacing provided on both the front faces and the back face of said metallic substrate, said cooling pipes being respectively arranged in said recesses.

7. Heat-resisting plate according to claim 5, wherein the number of said cooling pipes provided on the front face of said metallic substrate is the same as the number of said cooling pipes provided on the back face of said metallic substrate.

8. Heat-resisting plate according to claim 6, wherein the number of said cooling pipes provided on the front face of said metallic substrate is the same as the number of said cooling pines which are provided on the back face of said metallic substrate.

* * * * *